United States Patent
Kashyap et al.

(10) Patent No.: US 9,915,988 B2
(45) Date of Patent: Mar. 13, 2018

(54) DATA STORAGE DEVICE FOR A DEVICE ACCESSORY

(71) Applicant: SANDISK TECHNOLOGIES INC., Plano, TX (US)

(72) Inventors: Manohar Prasad Kashyap, Milpitas, CA (US); Eyal Felix Hakoun, Milpitas, CA (US); Vadim Shain, Milpitas, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/861,062

(22) Filed: Sep. 22, 2015

(65) Prior Publication Data

US 2017/0083068 A1 Mar. 23, 2017

(51) Int. Cl.
*H04M 1/00* (2006.01)
*G06F 1/26* (2006.01)
*H02J 7/00* (2006.01)

(52) U.S. Cl.
CPC .............. *G06F 1/26* (2013.01); *H02J 7/0077* (2013.01); *H02J 2007/005* (2013.01); *H02J 2007/0096* (2013.01)

(58) Field of Classification Search
CPC .................................. G06F 1/26; H02J 7/0077
USPC ............ 455/571–574, 575.1–575.8; 370/338
See application file for complete search history.

(56) References Cited

U.S. PATENT DOCUMENTS

| 9,031,066 B2 | 5/2015 | Hong et al. | |
| 2012/0178505 A1* | 7/2012 | Yang | G06F 1/263 |
| | | | 455/573 |
| 2012/0289291 A1* | 11/2012 | Moran | H04M 1/0256 |
| | | | 455/566 |
| 2013/0207599 A1 | 8/2013 | Ziv et al. | |
| 2013/0267274 A1 | 10/2013 | Hsu et al. | |
| 2014/0035380 A1 | 2/2014 | Stevens et al. | |
| 2014/0179375 A1 | 6/2014 | Yang et al. | |
| 2015/0084584 A1 | 3/2015 | Monks et al. | |
| 2015/0350807 A1* | 12/2015 | Andrews | H04W 4/003 |
| | | | 455/414.2 |

OTHER PUBLICATIONS

Space Pack Made for iPhone 5s/5, http://www.mophie.com/shop/space-pack-iphone-5s, printed Jul. 7, 2015, 1 page.
Free WiFi: The iPhone case that's a 4G hotspot, http://www.electricpig.co.uk/2012/03/22/free-wifi-the-iphone-case-thats-a-4g-hotspot/, printed Jul. 1, 2015, 4 pages.

\* cited by examiner

*Primary Examiner* — Marcos Batista
(74) *Attorney, Agent, or Firm* — Toler Law Group, PC

(57) ABSTRACT

An accessory associated with a wireless device includes a first interface configured to communicate with the wireless device using a wired communication technique and a second interface configured to communicate with the wireless device using a wireless communication technique. The accessory further includes a data storage device and a controller coupled to the first interface, to the second interface, and to the data storage device. The controller is configured to activate the first interface in response to a message received via the second interface.

16 Claims, 6 Drawing Sheets

DATA STORAGE DEVICE FOR A DEVICE ACCESSORY

FIELD OF THE DISCLOSURE

The present disclosure is generally related to data storage devices and accessories for electronic devices that include data storage devices, such as cases for wireless devices.

BACKGROUND

Storage devices enable electronic devices to store and retrieve data. For example, a wireless device (e.g., a smart phone) may include a processor and a storage device that stores instructions and data that are accessible to the processor.

Examples of storage devices include volatile memory devices and non-volatile memory devices. A non-volatile memory device may retain data after a power-down event, facilitating convenient and portable data storage.

An electronic device may include a battery to provide a supply voltage to components of the electronic device when the electronic device is disconnected from a mains outlet or other power supply. For example, a wireless device may include a battery to provide a supply voltage to a storage device and to a processor. As data storage density and processing capabilities of the wireless device increase, battery consumption increases, reducing portability of the wireless device.

Further, batteries typically have a finite life cycle. For example, as a battery of a wireless device is subject to more charging cycles, the battery may discharge more quickly during operation, which may prompt a user to reconnect the wireless device to a mains outlet or other power supply more often. In addition, as a user stores and accesses more information at a data storage device of a wireless device, battery power consumption of the wireless device is increased.

DETAILED DESCRIPTION

Figure 1A:
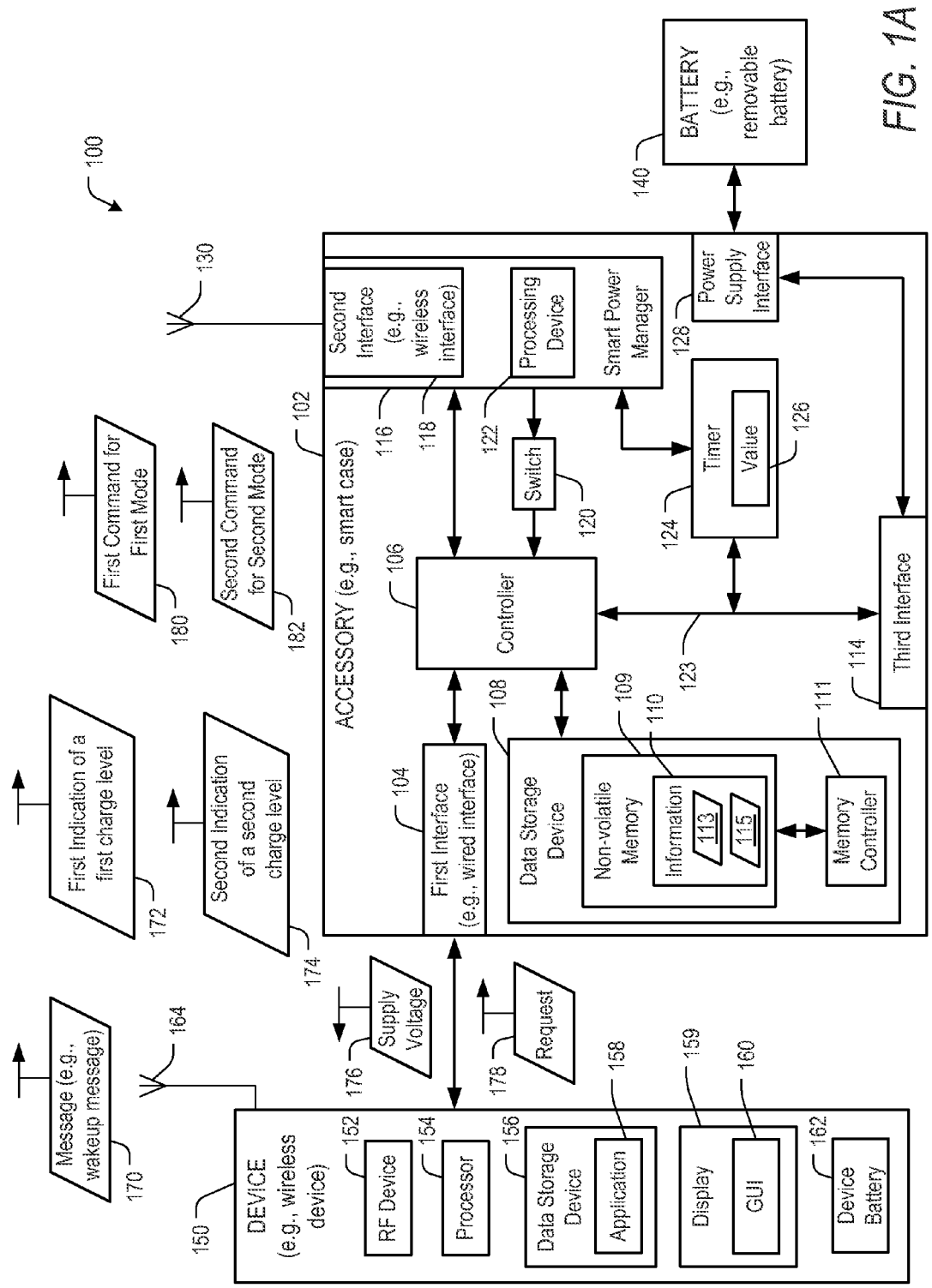
FIG. 1A is a diagram of a particular illustrative example of a system that includes a device, an accessory to the device, and a battery associated with the accessory.

An accessory of a device (e.g., a smart case for a smart phone) may include a data storage device and a battery (e.g., an auxiliary battery to the device that is integrated within the accessory). The data storage device may function as auxiliary storage for the device, and the battery may provide power to the data storage device and to the device.

The accessory may be configured to selectively enable or disable charging of the device by the battery based on a charge level of the device. For example, in some implementations, the accessory may activate charging of the device if the charge level is less than a first threshold (e.g., a "minimum" threshold) and may disable charging of the device by the battery if the charge level exceeds a second threshold (e.g., a "maximum" threshold). In an illustrative implementation, the first threshold and the second threshold may be designated by a user of the device, such as via an application associated with the accessory.

By disabling charging before the charge level reaches 100% battery capacity, battery usage of the device may be decreased. For example, charging the device to 100% may cause an operating system of the device to determine that the device is connected to a mains outlet and to operate according to a "full power" mode, increasing battery usage of the device. Thus, disabling charging before the charge level reaches 100% may reduce or avoid operation of the device according to a "full power" mode.

In addition, operating life of certain battery devices may be extended by reducing or avoiding charging to 100% of battery capacity. For example, certain devices may be associated with a particular number of charge cycles, such as a maximum number of charge cycles before battery capacity is substantially reduced. In this case, charging to 100% battery capacity and continuing to charge the battery after reaching 100% battery capacity may cause the device to alternate between charging and non-charging modes. Thus, avoiding charging to 100% of battery capacity may increase battery life of a battery by reducing a number of charge cycles of the battery.

Alternatively or in addition, the accessory may include multiple interfaces to the device to enable one or more components of the accessory to operate according to a low power mode. For example, a controller of the accessory may operate in or according to the low power mode if the controller is not scheduled to perform one or more tasks. As another example, a data storage device of the accessory may operate according to the low power mode. A first interface (e.g., a wired interface) from the controller to the device may be deactivated (e.g., to disable wired communications and charging between the accessory and the device). The accessory may include a second interface (e.g., a wireless interface) configured to communicate with the device. For example, the second interface may request an indication of the charge level of the device to determine whether the first interface is to be activated to enable charging of the device. As another example, the second interface may receive a wake up message from the device indicating that the first interface is to be activated, such as to enable the device to access a data storage device that may be integrated within the accessory to provide auxiliary data storage to the device.

The low power mode of one or more components of the accessory (e.g., the controller and the data storage device) may be controlled automatically by the accessory. For example, the accessory may initiate the low power mode and may exit the low power mode without user intervention, such as without requiring a user to activate a physical switch.

To further illustrate, particular aspects are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Referring to FIG. 1A, an illustrative example of a system is depicted and generally designated 100. The system 100 includes a device 150, an accessory 102 associated with the device 150, and a battery 140 associated with the accessory 102. As an illustrative example, the device 150 may correspond to a wireless device (e.g., a smart phone), and the accessory 102 may correspond to a case (e.g., a protective case and/or a smart case) configured to receive the device 150.

The accessory 102 includes a first interface 104 and a second interface 118. The first interface 104 is configured to communicate with the device 150 using a first communication technique, and the second interface 118 is configured to communicate with the device 150 using a second communication technique that is different from (e.g., "out-of-band" with respect to) the first communication technique. For example, the first interface 104 may be configured to communicate with the device 150 using a wired communication technique, and the second interface 118 may be configured to communicate with the device 150 using a wireless communication technique. To further illustrate, the first interface 104 may include a wired interface, and the second interface 118 may include a wireless interface, such as a Bluetooth® compliant interface (Bluetooth is a trademark of the Bluetooth® Special Interest Group of Kirkland, Wash.), a Bluetooth® low energy (BLE) compliant interface, a near field communication (NFC) interface, an optical interface, an acoustical interface (e.g., an ultrasound interface), a vibration-based interface, or another communication interface, as illustrative examples. As used herein, a wired communication technique may utilize a physical medium (e.g., one or more wires and/or a bus structure), and a wireless communication technique may use an optical communication technique, an acoustical communication technique, a vibrational communication technique, or another communication technique, as illustrative examples.

The accessory 102 further includes a controller 106. The controller 106 is coupled to the first interface 104 and to the second interface 118. FIG. 1A also depicts that the accessory 102 may include a smart power manager 116 that may include (or that may be coupled to) the second interface 118, a processing device 122 (e.g., a microcontroller), and an antenna 130. FIG. 1A further illustrates that a data storage device 108 may be integrated within the accessory 102. The data storage device 108 may be coupled to the controller 106 and to a timer 124, which may be coupled to the controller 106, to the smart power manager 116, or both.

The accessory 102 may be coupled to the battery 140. For example, the accessory 102 may include a power supply interface 128 that is configured to couple the accessory 102 (e.g., electrically and mechanically) to the battery 140. As an illustrative example, the power supply interface 128 may include one or more circuit components (e.g., a capacitor or another component) configured to generate a supply voltage 176 using the battery 140, and the first interface 104 may be configured to provide the supply voltage 176 to the device 150 to charge the device 150. One or more components of the accessory 102 may be powered by the battery 140. The accessory 102 is configured to receive power from the battery 140.

FIG. 1A also illustrates that the accessory 102 may include a switch 120. The switch 120 may be coupled to the controller 106 and to the power supply interface 128. The switch 120 may include one or more transistors, such as a p-type metal-oxide-semiconductor field-effect transistor (pMOSFET) or an n-type metal-oxide-semiconductor field-effect transistor (nMOSFET), as illustrative examples. The switch 120 may function as a "zero-power" switch.

The accessory 102 may also include a third interface 114. For example, the third interface 114 may include a universal serial bus (USB) interface or a micro-USB interface configured to enable a user to access data stored at the data storage device 108. As another example, the third interface 114 may be configured to charge the battery 140 (e.g., by providing a mains supply voltage to the battery 140 when the third interface 114 is coupled to a power supply or a mains outlet). The third interface 114 may be coupled to the controller 106 (e.g., via a connection 123).

The battery 140 may function as an auxiliary battery of the device 150. In some implementations, the battery 140 is removable from the accessory 102. In other implementations, the battery 140 may be integrated within the accessory 102. Depending on the particular implementation, the battery 140 may be coupled to the accessory 102 or may be included in the accessory 102.

The device 150 may include a radio frequency (RF) device 152. The RF device 152 may be configured to send information to the accessory 102 and to receive information from the accessory 102. For example, the RF device 152 may be coupled to an antenna 164, and the antenna 164 may communicate with the antenna 130 of the accessory 102. Depending on the particular implementation, the device 150 may correspond to a mobile telephone, a computer (e.g., a laptop, a tablet, or a notebook computer), an electrical component of a vehicle, a music player, a video player, a gaming device or console, an electronic book reader, a personal digital assistant (PDA), a portable navigation device, another electronic device, or a combination thereof.

The device 150 may further include a processor 154 (e.g., a host processor, such as a central processing unit). The device 150 may further include a data storage device 156 to store an application 158 associated with the accessory 102. The application 158 may be executable by the processor 154 to perform one or more operations associated with the accessory 102. For example, the application 158 may be executable by the processor 154 to enable a user to control one or more parameters associated with the accessory 102, such as to store and retrieve data at the data storage device 108. As another example, the application 158 may be executable by the processor 154 to perform power control operations associated with charging of a device battery 162 of the device 150 by the accessory 102. The user may control the one or more parameters of the accessory 102 using a graphical user interface (GUI) 160 that is presented using a display 159 of the device 150. The device battery 162 may be configured to receive the supply voltage 176 from the accessory 102.

Each of the data storage devices 108, 156 may include a memory device (e.g., one or more memory dies) and a memory controller coupled to the memory device. For example, the data storage device 108 may include a memory device including a non-volatile memory 109. As another example, the data storage device 108 may include a memory controller 111 coupled to the non-volatile memory 109. Alternatively, functions of a memory controller may be performed by another device. As an example, in some implementations, the controller 106 may operate as a memory controller of the data storage device 108. As another example, the processor 154 may operate as a memory controller of the data storage device 156.

Each of the data storage devices 108, 156 may include a memory, such as a non-volatile memory of storage elements included in a memory die. An example of a memory is a flash memory (e.g., a NAND flash memory) or a resistive memory, such as a resistive random access memory (Re- RAM), as illustrative examples. A memory may have a three-dimensional (3D) memory configuration. As used herein, a 3D memory device may include multiple physical levels of storage elements (instead of having a single physical level of storage elements, as in a planar memory device). In a particular implementation, the data storage devices 108, 156 each include a non-volatile memory having a 3D memory array configuration that is monolithically formed in one or more physical levels of arrays of memory cells having an active area disposed above a silicon substrate. Alternatively, one or more of the data storage devices 108, 156 may have another configuration, such as a two-dimensional (2D) memory configuration or a non-monolithic 3D memory configuration (e.g., a stacked die 3D memory configuration).

During operation, the accessory 102 may receive one or more requests from the device 150 for access to the data storage device 108. For example, the controller 106 of the accessory 102 may receive a request 178 from the processor 154 of the device 150 using the first interface 104. The request 178 may correspond to a request for write access to the data storage device 108 or a request for read access to the data storage device 108, as illustrative examples. The controller 106 may be configured to write data to the data storage device 108 and to read data from the data storage device 108 in response to requests received from the device 150, such as in response to receiving the request 178.

In some circumstances, one or more components of the accessory 102 may operate according to a low power mode of operation (e.g., a standby mode of operation or a shutdown state). For example, the controller 106 may operate according to a low power mode of operation when the controller 106 is not performing one or more tasks, such as read operations and write operations to the data storage device 108. The controller 106 may be configured to reset a value 126 of the timer 124 in response to performing a task. In this case, the value 126 may indicate a time interval since performance of a previous task by the controller 106 (e.g., performance of a memory access operation to the data storage device 108).

To initiate the low power mode of operation, the controller 106 may deactivate the first interface 104, such as by powering down the first interface 104 (e.g., by deactivating a transistor to remove power supplied from the battery 140 to one or more components of the first interface 104). In this example, the accessory 102 is configured to deactivate the first interface 104 by removing power from the first interface 104. Alternatively or in addition, the controller 106 may cease to provide a status signal (e.g., a ready signal) to the device 150 via the first interface 104 that indicates that the controller 106 is active (e.g., ready to receive one or more commands from the device 150 via the first interface 104).

In response to the value 126 of the timer 124 satisfying a timer threshold (e.g., the timer 124 may expire after a threshold number of minutes or seconds since performing a previous task), the controller 106 may initiate the low power mode of operation. In this case, the controller 106 may provide an indication to the smart power manager 116 that the controller 106 is to operate according to a low power mode of operation (e.g., an indication that the controller 106 is to initiate a shutdown process).

In response to the indication, the smart power manager 116 may provide an acknowledgment (e.g., a ping) to the controller 106. In response to the acknowledgment, the controller 106 may initiate the shutdown process, such as by deactivating the first interface 104 (e.g., decoupling one or more drivers or other components of the first interface 104 from a supply node by deactivating one or more transistors, as an illustrative example). In some implementations, deactivating the first interface 104 includes disconnecting the supply voltage 176 from the device 150 by deactivating one or more transistors.

The controller 106 may also request that the smart power manager 116 deactivate the switch 120. For example, in some implementations, the switch 120 includes a transistor, and the smart power manager 116 may be configured to deactivate the transistor by applying a particular voltage to a gate terminal of the switch. In this example, the smart power manager 116 may deactivate the switch 120 to interrupt power supplied from the battery 140 to the controller 106 and/or one or more other components of the accessory 102, such as the data storage device 108, the battery 140, one or more other components, or a combination thereof.

While the controller 106 operates according to the low power mode of operation, the smart power manager 116 may operate according to a standby mode of operation or according to an active mode of operation. During either the standby mode of operation or the active mode of operation, the smart power manager 116 may communicate with the device 150 using the antennas 130, 164.

As an example, in some circumstances, the device 150 may provide a message 170 (e.g., a wakeup message) to the smart power manager 116 from the antenna 164 to the antenna 130. To further illustrate, the device 150 may send the message 170 in response to receiving user input via the GUI 160, such as user input requesting access to data stored at the data storage device 108, or other user input associated with the accessory 102. As another example, the smart power manager 116 may periodically communicate with the device 150 using the second interface 118, such as in response to a timer value (e.g., the value 126 of the timer 124, or a value of another timer) satisfying a timer threshold (e.g., a threshold number of minutes or seconds).

The processing device 122 may be configured to determine whether one or more tasks are to be performed by the controller 106 (e.g., one or more memory access operations to access the data storage device 108). For example, the message 170 may indicate that the first interface 104 is to be activated to enable communication with the device 150. The message 170 may be sent from the device 150 to the accessory 102 using a wireless communication technique.

If the processing device 122 determines that one or more tasks are to be performed by the controller 106, the processing device 122 may cause the smart power manager 116 to activate the switch 120 (to provide power to the controller 106) and to wake the controller 106 (e.g., to boot up the controller 106) after activating the switch 120. Upon waking, the controller 106 may activate the first interface 104 (e.g., to enable wired communications with the device 150). The second interface 118 may be configured to receive the message 170 from the device 150 when the first interface 104 is inactive (e.g., powered down or in a sleep mode), and the controller 106 may be configured to activate the first interface 104 in response to the message 170 received via the second interface 118. To further illustrate, the controller 106 may be configured to activate the first interface 104 by powering up the first interface 104 (e.g., by activating a transistor to cause power to be supplied from the battery 140 to one or more components of the first interface 104). Alternatively or in addition, the controller 106 may provide a status signal (e.g., a ready signal) to the device 150 via the first interface 104 to indicate that the controller 106 is active (e.g., ready to receive one or more commands from the device 150 via the first interface 104).

The accessory 102 may be configured to perform certain smart charging operations to selectively charge the device battery 162 using the supply voltage 176. For example, the accessory 102 may be configured to selectively provide the supply voltage 176 to the device 150 using the first interface 104 if a charge level of the device battery 162 fails to satisfy a threshold charge level. As another example, the accessory 102 may cease to provide the supply voltage 176 to the device 150 (e.g., by deactivating a transistor) in response to a charge level of the device battery 162 satisfying another threshold charge level.

To further illustrate, the device 150 may provide a first indication 172 to the accessory 102 indicating a first charge level of the device battery 162. The first indication 172 may be provided to the accessory 102 using the first interface 104 or using the second interface 118. As another example, the device 150 may provide a second indication 174 indicating a second charge level of the device battery 162 to the accessory 102 using the first interface 104 or using the second interface 118.

In some implementations, the controller 106 is configured to poll the device 150 to obtain one or more of the first indication 172 or the second indication 174. As an example, the controller 106 may be configured to poll the device 150 using the first interface 104 to request the device 150 to provide one or more of the first indication 172 or the second indication 174. The device 150 may include an operating system (OS) or an application programming interface (API) that determines a charge level of the device battery 162, such as using a sensor (e.g., a current sensor) of the device 150.

The accessory 102 may be configured to compare a charge level of the device 150 (e.g., a charge level indicated by the first indication 172 or the second indication 174) to one or more thresholds to determine whether to enable or disable charging of the device 150 by the battery 140. For example, in some implementations, the accessory 102 may be configured to enable charging of the device 150 by the battery 140 in response to determining that the charge level is less than a first threshold 113 (e.g., a "lower" or "minimum" threshold), such as by connecting a voltage supply line to the device 150 by activating a transistor that is coupled to the voltage supply line. As another example, the accessory 102 may be configured to disable charging of the device 150 by the battery 140 in response to determining that the charge level exceeds a second threshold 115 (e.g., an "upper" or "maximum" threshold), such as by disconnecting a voltage supply line from the device 150 by deactivating a transistor that is coupled to the voltage supply line. As an illustrative, non-limiting example, the first threshold 113 may correspond to a 50% battery capacity of the device battery 162, and the second threshold 115 may correspond to a 90% charge level of the device battery 162. It should be appreciated that the particular threshold or thresholds may be selected based on the particular application (e.g., battery type, battery capacity, battery charging rate, battery discharge rate, device type, expected use level, one or more other parameters, or a combination thereof).

In some examples, the first threshold 113 and the second threshold 115 may be default parameters that are indicated by information 110 stored at the accessory 102. In this example, the first threshold 113 and the second threshold 115 may correspond to "factory" parameters and the information 110 may be stored at the accessory 102 by a vendor of the accessory 102. In an illustrative implementation, the information 110 is stored at the data storage device 108. In this example, the controller 106 may retrieve the information 110 from the data storage device 108 and may load the information 110 to a random access memory (RAM) of the accessory 102 (e.g., in response to a boot up process at the controller 106).

Alternatively or in addition, the first threshold 113 and the second threshold 115 may be set by a user of the accessory 102. To illustrate, in some implementations, the device 150 may receive user input via the GUI 160 specifying one or more of the first threshold 113 or the second threshold 115. For example, during execution of the application 158 by the processor 154, the GUI 160 may prompt a user to adjust one or more of the first threshold 113 or the second threshold 115. In this particular example, one or more of the first indication 172 or the second indication 174 may be provided by the device 150 to the accessory 102 in response to user input received at the device 150 (e.g., via the GUI 160). One or more of the first interface 104 or the second interface 118 may be configured to receive one or more parameters associated with the information 110 from the device 150 (e.g., from the GUI 160 and via the RF device 152). For example, the one or more parameters may specify one or more of the first threshold 113 or the second threshold 115. The controller 106 may be configured to initiate storage of the information 110 at the data storage device 108 (e.g., after receiving the information 110 from the device 150 via the first interface 104 or the second interface 118).

In some implementations, the device 150 is configured to control power consumption associated with the accessory 102. For example, one or more of the first interface 104 or the second interface 118 may be configured to receive a first command 180 from the device 150. The first command 180 indicates that the accessory 102 is to operate according to a first mode. As another example, one or more of the first interface 104 or the second interface 118 may be configured to receive a second command 182 from the device 150. The second command 182 indicates that the accessory 102 is to operate according to a second mode. In this example, the second mode may be associated with a higher power consumption of one or more components of the accessory 102 as compared to the first mode. As an illustrative example, the commands 180, 182 may be provided to the accessory 102 to control power consumption of the data storage device 108, such as in response to user input received at the device 150 (e.g., via the GUI 160). For example, the GUI 160 may receive input from a user exiting (e.g., "closing") the application 158. In this example, the first command 180 may indicate that the data storage device 108 is to operate according to the first mode. As another example, the GUI 160 may receive input from a user to load (e.g., "open") the application 158. In this example, the second command 182 may indicate that the data storage device 108 is to operate according to the second mode.

Figure 1B:
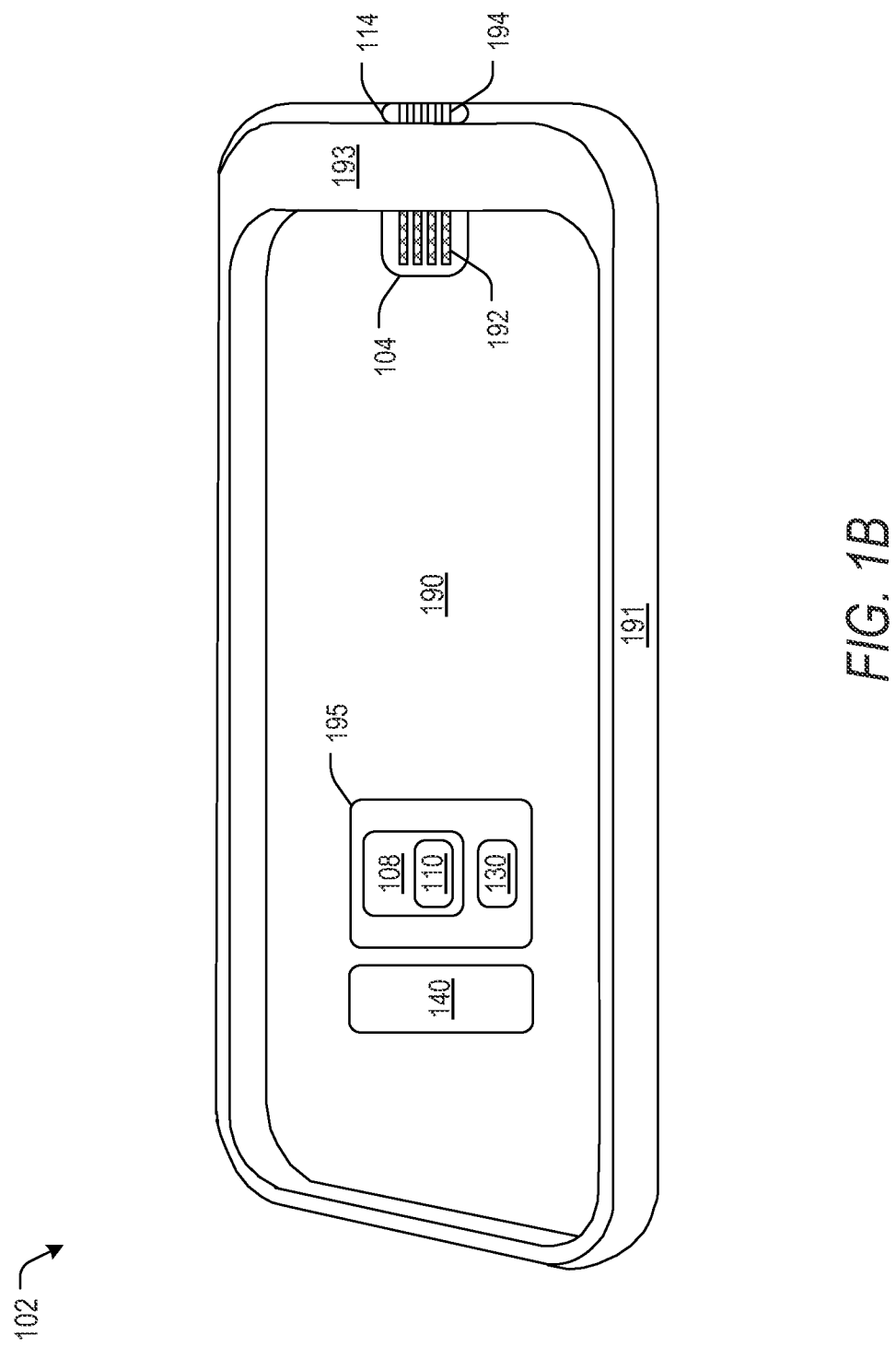
FIG. 1B is a perspective diagram of an illustrative example of the accessory of FIG. 1A.

To further illustrate, FIG. 1B illustrates a perspective view of an illustrative example of the accessory 102 of FIG. 1A. FIG. 1B illustrates certain example configurations of the interfaces 104, 114 of FIG. 1B.

The accessory 102 may be configured to receive the device 150 of FIG. 1A. The device 150 of FIG. 1A may be mechanically connected (e.g., attached) to the accessory 102 and may adjoin a surface 190 of the accessory 102. As used herein, the accessory 102 may be "mechanically connected" to the device 150 if the device 150 is received in (e.g., at least partially enclosed by) the accessory 102. For example, a back surface of the device 150 (e.g., a surface opposite to the display 159) may adjoin (e.g., contact) the surface 190. The accessory 102 may at least partially enclose the device 150 after the device 150 is attached to the accessory 102. For example, surfaces 191, 193 may "wrap around" the device 150. The surfaces 190, 191, and 193 may adjoin the back surface of the device 150 and side surfaces of the device 150. In some implementations, the surfaces 191, 193 may adjoin a portion of a front surface of the device 150 (e.g., may partially enclose a front surface of the device 150). The accessory 102 is external to the device 150 and is removable with respect to the device 150.

In some implementations, the accessory 102 includes a printed circuit board (PCB) 195, and one or more components of the accessory 102 are mounted upon or connected to the PCB 195. To illustrate, FIG. 1B depicts that the data storage device 108 and the antenna 130 may be mounted upon or connected to the PCB 195. The data storage device 108 may store the information 110, and the battery 140 may be connected to the PCB 195. Although FIG. 1B depicts that the PCB 195 may be connected to the surface 190 (e.g., a front surface of the accessory 102), it should be appreciated that the PCB 195 may be integrated within the accessory 102 (e.g., inside the accessory 102 and beneath the surface 190 instead of on the surface 190).

The example of FIG. 1B illustrates that the first interface 104 may include a set of pins, which may include a representative pin 192. The first interface 104 may have an 8-pin configuration, a 30-pin configuration, a 24-pin configuration, or another configuration, as illustrative examples.

The example of FIG. 1B also illustrates that the third interface 114 may include a set of slots, such as a representative slot 194. To illustrate, the third interface 114 may have a USB configuration and may be configured to receive a USB connector in at least one slot in the set of slots. Alternatively, the third interface 114 may have a micro-USB configuration and may be configured to receive a micro-USB connector. In some implementations, the interfaces 104, 114 have a common configuration (e.g., an 8-pin configuration, a 30-pin configuration, a 24-pin configuration, or another configuration, as illustrative examples).

The accessory 102 may have a particular form factor. For example, a form factor of the accessory 102 may be selected based on dimensions of a device, such as the device 150 of FIG. 1A. It should be appreciated that the particular implementation of FIG. 1B is provided for illustration and that size and/or features of the accessory 102 may be selected based on the particular application.

The examples of FIGS. 1A and 1B may enable smart charging of the device 150 by the accessory 102. For example, disabling charging to the device 150 may avoid a circumstance in which the processor 154 detects that the device 150 is coupled to a mains outlet (and in which case the processor 154 may operate according to a "full power" mode, increasing battery consumption). As another example, by disabling charging to the device 150 before the charge level of the device battery 162 reaches 100% battery capacity, a number of charge cycles at the device 150 may be reduced (e.g., by avoiding a circumstance in which the device 150 toggles between charging and non-charging modes of operation).

Figure 2:
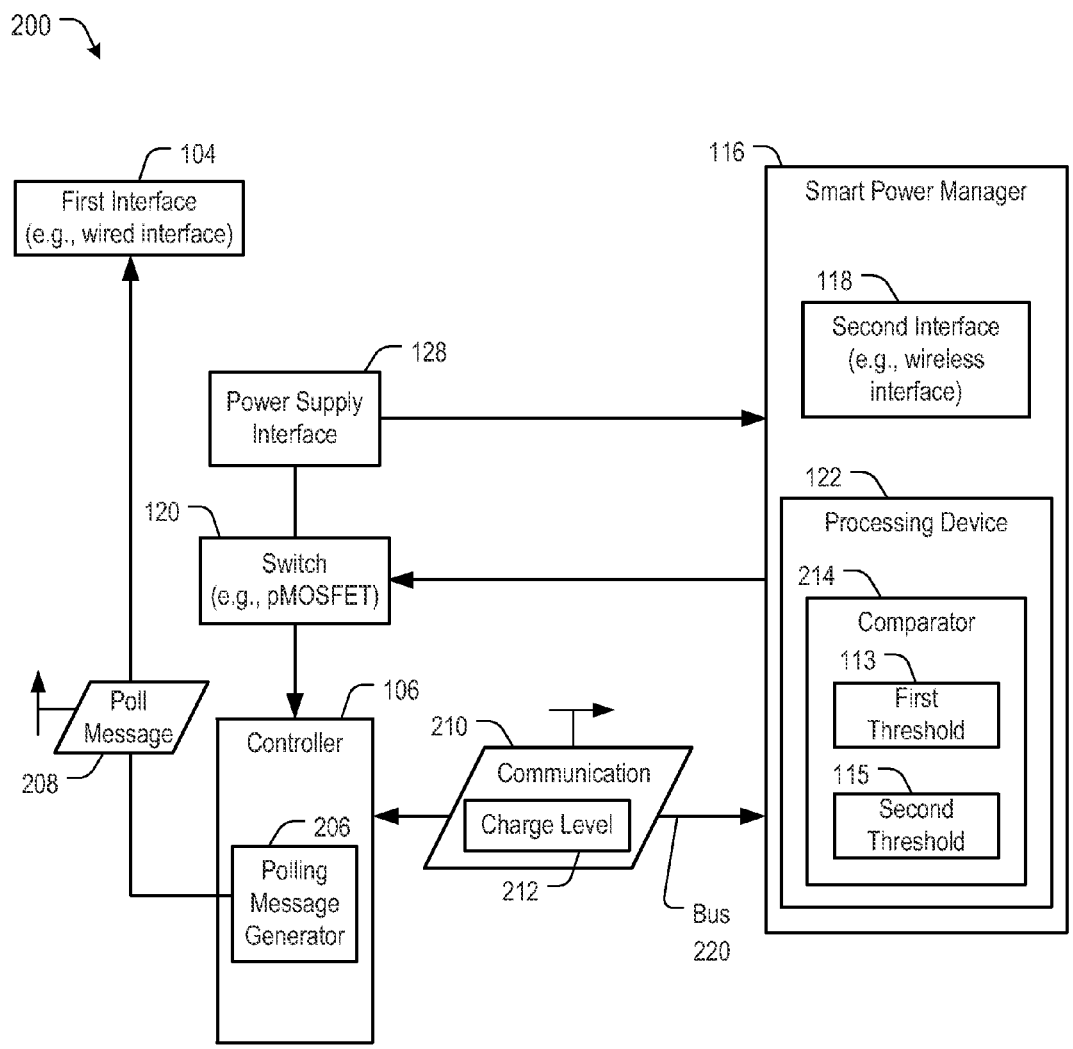
FIG. 2 is a diagram illustrating particular aspects of an example of the accessory of FIG. 1A.

Referring to FIG. 2, an illustrative example of components that may be included in the accessory 102 of FIG. 1A is depicted and generally designated 200. One or more features described with reference to FIG. 2 may be as described with reference to FIG. 1A. For example, the components 200 may include the first interface 104, the controller 106, the smart power manager 116, the switch 120, and the power supply interface 128. The smart power manager 116 is coupled to the switch 120, and the switch 120 is coupled to the controller 106. FIG. 2 also illustrates that the controller 106 may include a polling message generator 206. The controller 106 may be coupled to the smart power manager 116 via a bus 220, such as a serial peripheral interface (SPI) bus, as an illustrative example.

FIG. 2 also illustrates that the processing device 122 may include a comparator 214. Depending on the particular application, the comparator 214 may be implemented by one or more instructions executable by the processing device 122 to perform comparison operations, a comparator device (e.g., a comparator circuit), or a combination thereof. The comparator 214 may be configured to perform comparison operations, as described further below.

In the example of FIG. 2, the power supply interface 128 is configured to provide a supply voltage using the battery 140 of FIG. 1A. The power supply interface 128 is coupled to provide the supply voltage to the controller 106 via the switch 120 and to the smart power manager 116. In some implementations, the first interface 104 includes an active interface (e.g., one or more drivers), and the power supply interface 128 may be configured to provide the supply voltage to the first interface 104. In other implementations, the first interface 104 may include a passive interface (e.g., one or more passive components configured to provide signals to the device 150, such as one or more wires).

During operation, the controller 106 may be configured to determine a charge level 212 associated with the device 150 of FIG. 1A. In an illustrative example, the polling message generator 206 may be configured to generate a poll message 208. The controller 106 may be configured to provide the poll message 208 to the device 150 using the first interface 104. In response to the poll message 208, the device 150 may provide an indication of the charge level 212, such as a value that indicates the charge level 212 (e.g., a number of volts corresponding to the charge level 212 or a percentage of an available charge of the device battery 162 relative to a battery capacity of the device battery 162). For example, the first indication 172 or the second indication 174 may indicate the charge level 212. Alternatively or in addition, the device 150 may indicate the charge level 212 to the controller 106 without prompting by the controller 106 (e.g., without receiving the poll message 208). Further, it should be noted that in some cases the first indication 172 and the second indication 174 may be provided to the accessory 102 using the second interface 118 via a wireless communication technique (instead of using the first interface 104).

In response to determining the charge level 212 associated with the device 150, the controller 106 may provide a communication 210 to the smart power manager 116 indicating the charge level 212. The controller 106 may provide the communication 210 to the smart power manager 116 using the bus 220. Alternatively, in some implementations, the smart power manager 116 may be configured to receive an indication of the charge level 212 from the device 150 (e.g., using the second interface 118). The comparator 214 may be configured to compare the charge level 212 to one or more of the first threshold 113 (e.g., a lower threshold) or the second threshold 115 (e.g., an upper threshold).

The smart power manager 116 may be configured to provide an enable signal to the controller 106 using the bus 220 to selectively enable or disable charging of the device 150 based on the charge level 212. As an example, the smart power manager 116 may assert the enable signal to cause the controller 106 to provide the supply voltage 176 of FIG. 1A to the device 150 (e.g., by connecting a voltage supply line to the device 150 by activating a transistor that is coupled to the voltage supply line) in response to the charge level 212 being less than the first threshold 113. As another example, the smart power manager 116 may de-assert (or continue to avoid asserting) the enable signal in response to the charge level 212 being greater than the second threshold 115 (e.g., by disconnecting a voltage supply line from the device 150 by deactivating a transistor that is coupled to the voltage supply line), which may cause the controller 106 to cease to provide (or to continue to inhibit providing) the supply voltage 176 of FIG. 1A to the device 150.

The controller 106 may enter a low power mode of operation when requests are not being handled at the controller 106. For example, while the device 150 of FIG. 1A is not sending one or more requests for access to the data storage device 108 of FIG. 1A, the controller 106 may deactivate the first interface 104. To initiate the low power mode of operation, the controller 106 may provide an indication to the smart power manager 116 using the bus 220. The smart power manager 116 may provide an acknowledgment (e.g., a ping) to the controller 106 using the bus 220 and may deactivate the switch 120 to interrupt power supplied to the controller 106 and/or to the first interface 104. The smart power manager 116 may be configured to wake the controller 106 in response to one or more events, such as in response to receiving a message from the device 150 via the second interface 118.

In some implementations, the smart power manager 116 may be further configured to selectively enable or disable charging to the battery 140 of FIG. 1A when the accessory 102 is coupled to a mains supply or other power supply via the third interface 114 of FIG. 1A. For example, in some implementations, the smart power manager 116 may include one or more sensor devices configured to detect a charge level of the battery 140 of FIG. 1A. The comparator 214 may be configured to compare the charge level of the battery 140 to determine whether the charge level satisfies a third threshold or a fourth threshold. In this example, the smart power manager 116 may include a second switch configured to enable charging of the battery 140 in response to the charge level being less than the third threshold and to disable charging of the battery 140 in response to the charge level exceeding the fourth threshold. To further illustrate, the third threshold and the fourth threshold may correspond to the first threshold 113 and the second threshold 115, respectively. Alternatively, the third threshold and the fourth threshold may correspond to other thresholds (e.g., thresholds that are different than the first threshold 113 and the second threshold 115).

The examples of FIG. 2 facilitate smart charging operations. For example, disabling charging to one or more of the battery 140 of FIG. 1A or the device battery 162 of FIG. 1A based on the charge level 212 (e.g., if the charge level 212 exceeds the second threshold 115) may avoid reaching a battery charge level of 100% battery capacity, increasing battery life.

Figure 3:
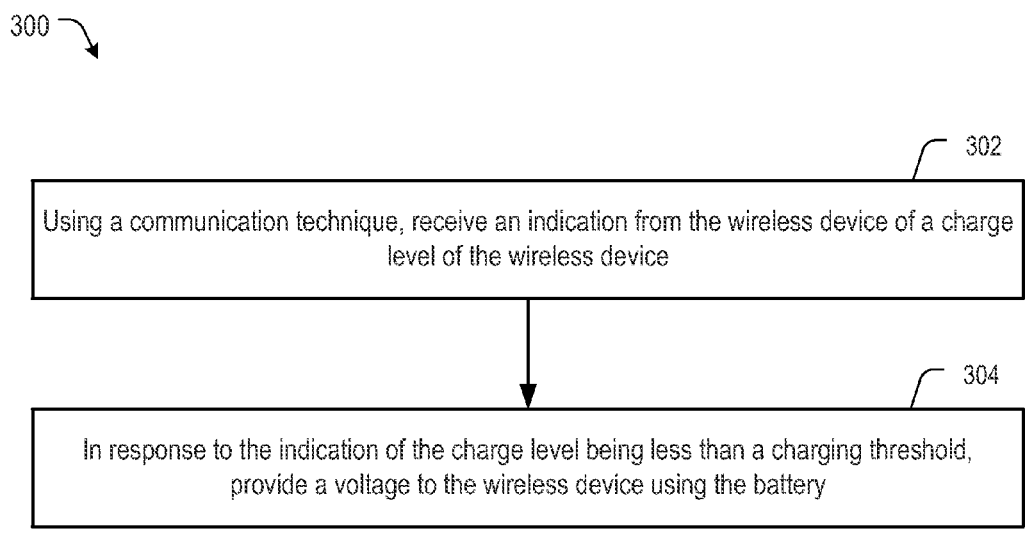
FIG. 3 is a flow chart of a particular illustrative example of a method of operation of the accessory of FIG. 1A.

Referring to FIG. 3, an illustrative example of a method is depicted and generally designated 300. The method 300 may be performed in an accessory (e.g., a case) that is mechanically connected to (e.g., attached to) a wireless device, such as the accessory 102 of the device 150. The case includes a data storage device and a battery, such as the data storage device 108 and the battery 140. The data storage device contains a charging threshold (e.g., the first threshold 113). The case may at least partially enclose the wireless device and may be external to the wireless device (e.g., the case may be detachable from the wireless device).

The method 300 includes receiving an indication from the wireless device of a charge level of the wireless device using a communication technique, at 302. For example, the accessory 102 may receive the first indication 172 of the first charge level of the device 150. The charge level may correspond to the charge level 212, as an illustrative example. The communication technique may be a wired communication technique, and the indication of the charge level may be received using the first interface 104. In another example, the communication technique may be a wireless communication technique, and the indication of the charged level may be received using the second interface 118.

The method 300 further includes providing a voltage to the wireless device using the battery in response to the charge level of the wireless device being less than the charging threshold, at 304. For example, the accessory 102 may provide the supply voltage 176 to the device 150 in response to the charge level 212 being less than the first threshold 113.

The method 300 may further include, prior to receiving the indication, waking a controller to enable the controller to receive the indication using a wired interface (e.g., the first interface 104). For example, the smart power manager 116 may be configured to wake the controller 106. In an illustrative example, the controller is woken in response to receiving a wakeup message (e.g., the message 170) from the wireless device using a wireless interface (e.g., the second interface 118). In another example, the controller is woken in response to detecting that a value (e.g., the value 126) of a timer (e.g., the timer 124, or another timer) satisfies a timer threshold.

In some implementations, the method 300 further includes receiving, using the wired interface, one or more of a request for write access to the data storage device or a request for read access to the data storage device. For example, the controller 106 may receive the request 178 using the first interface 104, and the request 178 may indicate read access (to read data from the data storage device 108) or write access to the data storage device 108 (to write data to the data storage device 108).

The method 300 further includes receiving a second indication of a second charge level of the wireless device after charging the wireless device by providing voltage to the wireless device. For example, the accessory 102 may receive the second indication 174 of the second charge level of the device 150. The method 300 may also include disconnecting the voltage from the wireless device in response to determining that the second charge level of the wireless device exceeds a second charging threshold. For example, the accessory 102 may disconnect the supply voltage 176 from the device 150 in response to determining that the second charge level exceeds the second threshold 115. In some implementations, the method 300 may include receiving information from the wireless device indicating one or more of the charging threshold or the second charging threshold. For example, in some cases, the device 150 may provide the information 110 to the accessory 102 (e.g., using the first interface 104 or the second interface 118). In some implementations, the method 300 may include storing the information at the data storage device (e.g., to enable retrieval of the information 110 after a power cycle at the accessory 102).

The method 300 of FIG. 3 may facilitate smart charging operations. For example, selectively enabling and/or disabling charging to a device may avoid reaching a battery charge level of 100% battery capacity, increasing battery life.

Figure 4A:
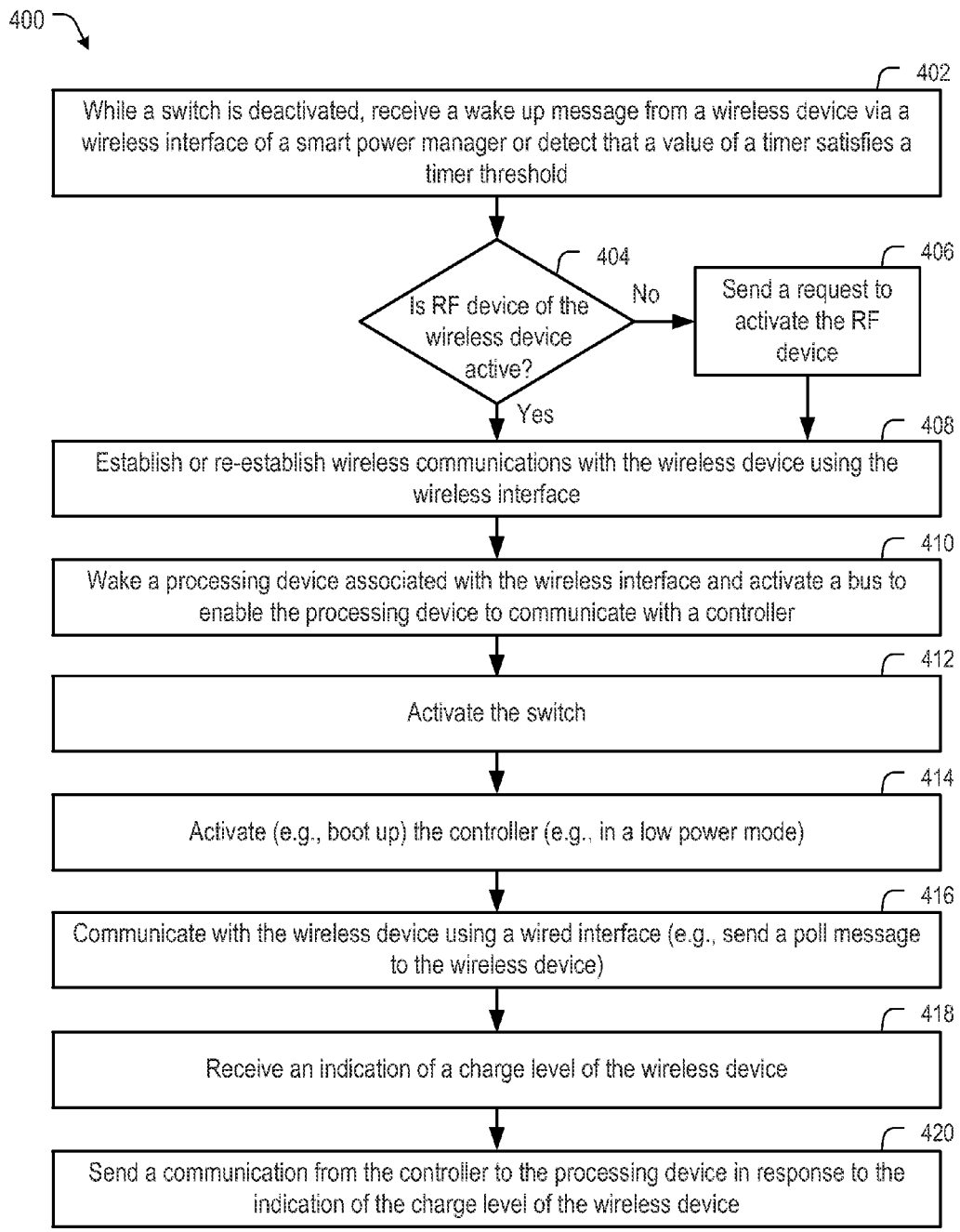
FIG. 4A is a flow chart of a first set of operations of another illustrative example of a method of operation of the accessory of FIG. 1A.

Referring to FIG. 4A, an illustrative example of a method is depicted and generally designated 400. The method 400 may be performed at an accessory of a device, such as the accessory 102 of the device 150.

The method 400 may include receiving a wakeup message from a device via a wireless interface of a smart power manager or detecting that a value of a timer satisfies a timer threshold while a switch is deactivated, at 402. For example, the message 170 may be received from the device 150 via the second interface 118 of the smart power manager 116 while the switch 120 is deactivated. As another example, the smart power manager 116 may detect that the value 126 of the timer 124 (or another timer) satisfies a timer threshold. In some implementations, the value 126 indicates a time interval since performance of a previous task by the controller 106 (e.g., performance of a memory access operation to the data storage device 108). In this case, the value 126 of the timer 124 may be reset in response to the controller 106 performing a task.

The method 400 may further include determining whether an RF device of the device is active, at 404. For example, the smart power manager 116 may send a message to the RF device 152 using the second interface 118 to determine whether the RF device 152 is active. If the RF device is inactive, the method 400 may include sending a request to activate the RF device, at 406. If the RF device is active, the method 400 may further include establishing or reestablishing wireless communications with the device using the wireless interface, at 408.

The method 400 may further include waking a processing device associated with the wireless interface and activating a bus to enable the processing device to communicate with a controller, at 410. For example, the processing device 122 may activate the bus 220 to enable the processing device 122 to communicate with the controller 106.

The method 400 may further include activating the switch, at 412. For example, the smart power manager 116 may activate the switch 120 to provide a supply voltage from the battery 140 to one or more of the controller 106, the first interface 104, the data storage device 108, or one or more other components of the accessory 102.

After activating the switch, the controller may be activated (e.g., booted up), at 414. For example, the controller 106 may boot up using a low power mode of operation. The controller may communicate with the device using a wired interface, at 416. For example, the wired interface may correspond to the first interface 104, and communicating with the device may include sending the poll message 208 to the device 150 using the first interface 104.

The method 400 may further include receiving an indication of a charge level of the device, at 418. For example, one or more of the first indication 172 or the second indication 174 may indicate the charge level 212.

The method 400 may also include sending a communication from the controller to the processing device in response to the indication of the charge level of the device, at 420. For example, the controller 106 may send the communication 210 to the processing device 122 to indicate the charge level 212. The method 400 of FIG. 4A is described further with reference to FIG. 4B.

Figure 4B:
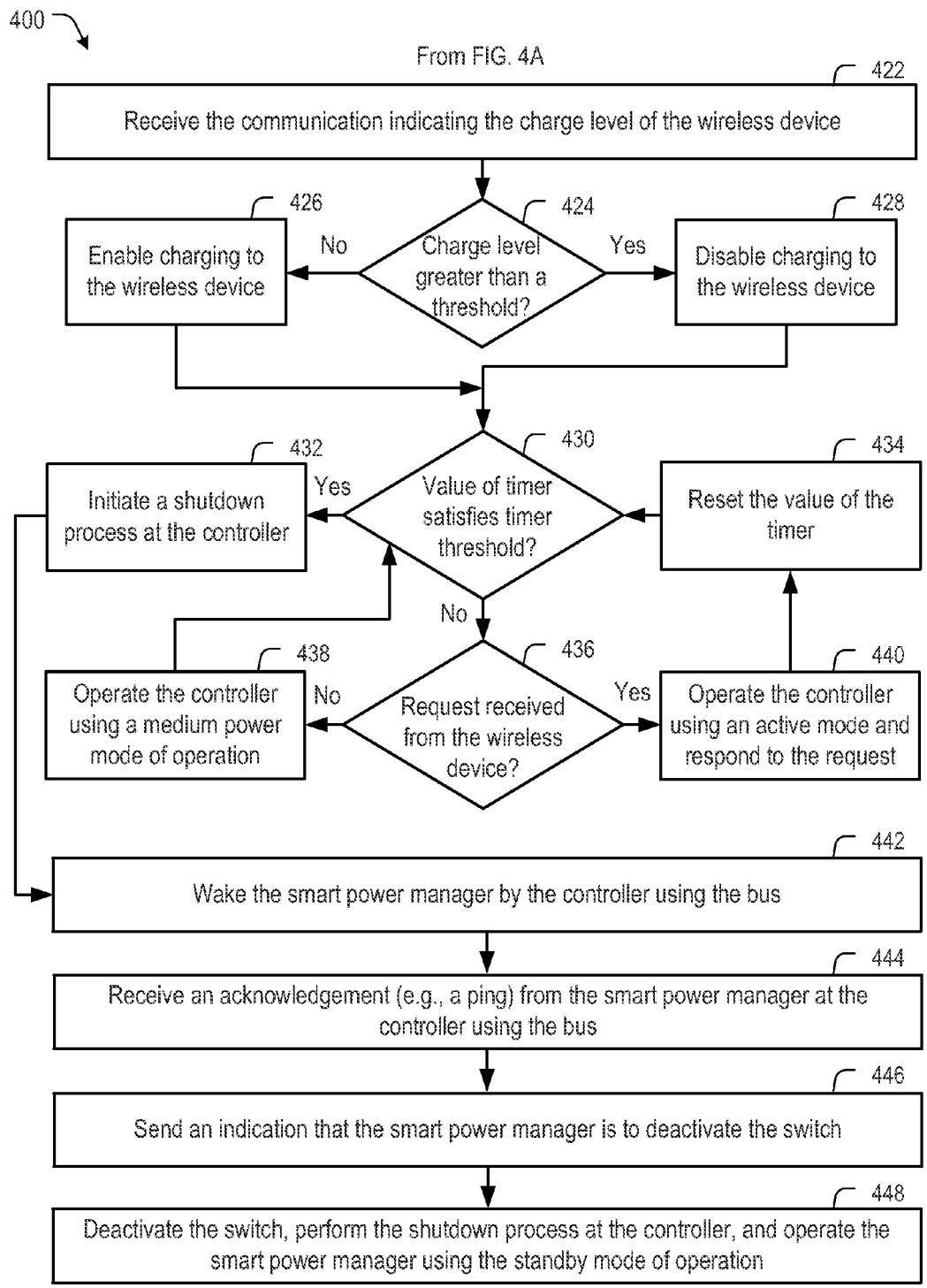
FIG. 4B is a flow chart of a second set of operations that may be performed in connection with the method of FIG. 4A.

Referring to FIG. 4B, the method 400 may also include receiving the communication indicating the charge level of the device, at 422, and determining whether the charge level exceeds a threshold, at 424. For example, the comparator 214 may compare the charge level 212 to the first threshold 113 or to the second threshold 115. In this example, if the charge level 212 exceeds the threshold, the method 400 may further include disabling charging to the device, at 428. If the charge level fails to exceed the threshold, the method 400 may include enabling charging to the device, at 426.

The method 400 may include determining whether a value of a timer satisfies a timer threshold, at 430. For example, the processing device 122 may be configured to determine whether the value 126 of the timer 124 satisfies the timer threshold. If the value of the timer satisfies the timer threshold, the method 400 may include initiating a shutdown process at the controller, at 432. If the value of the timer does not satisfy the timer threshold, the method 400 may include determining whether one or more requests are received from the wireless device, at 436. If one or more requests are received from the wireless device, the method 400 may include operating the controller using an active mode and responding to the request, at 440, and may further include resetting the value of the timer, at 434. If one or more requests are not received from the wireless device, the method 400 may include operating the controller using a medium power mode of operation, at 438.

Upon initiating the shutdown process at the controller, the method 400 may further include waking the smart power manager by the controller using the bus, at 442. For example, the controller 106 may wake the smart power manager 116 using the bus 220. The method 400 may also include receiving an acknowledgment (e.g., a ping) from the smart power manager at the controller using the bus, at 444. In response to receiving the acknowledgment, the controller may send an indication that the smart power manager is to deactivate the switch, at 446. The method 400 may also include deactivating the switch, performing the shutdown process at the controller, and operating the second interface using the standby mode of operation, at 448.

The method 400 of FIGS. 4A and 4B may facilitate smart charging operations. For example, selectively enabling and/or disabling charging to a device may avoid reaching a battery charge level of 100% battery capacity, increasing battery life.

A data storage device (e.g., the data storage device 108) may include a non-volatile memory (e.g., the non-volatile memory 109) and a memory controller (e.g., the memory controller 111) coupled to the non-volatile memory. The memory controller may be configured to receive information (e.g., the information 110) of an application of a device, such as the application 158 of the device 150. The memory controller may be further configured to store the information in the non-volatile memory to be accessible to a controller of a device accessory, such as the controller 106 of the accessory 102. The information may indicate a device battery charging threshold, such as the first threshold 113. Accessibility of the information to the controller of the device accessory may enable determination of whether to initiate charging of the device from a battery of the device accessory (e.g., the battery 140 of the accessory 102) based on the device battery charging threshold while the application is not executing at the device (e.g., if a charge level of the device battery 162 is less than the device battery charging threshold).

In some implementations, the information further indicates a second device battery charging threshold (e.g., the second threshold 115). In this case, accessibility of the information to the controller of the device accessory may further enable determination of whether to disable charging of the device from the battery of the device accessory based on the second device battery charging threshold (e.g., if a charge level of the device battery 162 exceeds the second device battery charging threshold).

To further illustrate, in some implementations, the device battery charging threshold corresponds to a first voltage of a device battery (e.g., the device battery 162) of the device, and the second device battery charging threshold corresponds to a second voltage of the device battery. In other implementations, the device battery charging threshold corresponds to a first ratio of a first available charge of the device battery to a battery capacity of the device battery, and the second device battery charging threshold corresponds to a second ratio of a second available charge of the device battery to the battery capacity. Alternatively or in addition, the device battery charging threshold and the second device battery charging threshold may correspond to other information.

Although various components depicted herein are illustrated as block components and described in general terms, such components may include one or more microprocessors, state machines, or other circuits configured to enable such components to perform one or more operations described herein. For example, the smart power manager 116 may represent physical components, such as hardware controllers, state machines, logic circuits, or other structures, to enable the smart power manager 116 to operate the switch 120 and/or to perform one or more other operations described herein.

Alternatively or in addition, the smart power manager 116 may be implemented using a microprocessor or microcontroller (such as the processing device 122) that is programmed to operate the switch 120 and/or to perform one or more other operations described herein. In a particular embodiment, one or more of the controller 106 or the processing device 122 includes a processor executing instructions (e.g., firmware) that are stored at the data storage device 108. Alternatively, or in addition, executable instructions that are executed by the processor may be stored at a separate memory location that is not part of the data storage device 108, such as at a read-only memory (ROM) of the accessory 102 or at the data storage device 156.

In some implementations, the data storage device 108 is embedded within the accessory 102. In one or more other implementations, the data storage device 108 is removable from the accessory 102, such as in accordance with a removable universal serial bus (USB) configuration. The data storage device 156 may be removable from or embedded within the device 150.

One or more of the data storage devices 108, 156 may operate in connection with an embedded MultiMedia Card (eMMC®) (trademark of JEDEC Solid State Technology Association, Arlington, Va.) configuration, as an illustrative example. As another example, one or more of the data storage devices 108, 156 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). One or more of the data storage devices 108, 156 may operate in compliance with a JEDEC industry specification. For example, one or more of the data storage devices 108, 156 may include may operate in compliance with a JEDEC eMMC specification, a JEDEC Universal Flash Storage (UFS) specification, one or more other specifications, or a combination thereof.

One or more of the data storage devices 108, 156 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. One or more of the data storage devices 108, 156 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
a non-volatile memory; and
a memory controller coupled to the non-volatile memory and configured to:
receive information of an application of a device, the information indicating a device battery charging threshold; and
store the information in the non-volatile memory to be accessible to a controller of a device accessory,
wherein accessibility of the information to the controller of the device accessory enables determination of whether to initiate charging of the device from a battery of the device accessory based on a charge level associated with the device and further based on the device battery charging threshold while the application is not executing at the device, the charge level independent of the device battery charging threshold.

2. The apparatus of claim 1, wherein the information further indicates a second device battery charging threshold.

3. The apparatus of claim 2, wherein accessibility of the information to the controller of the device accessory further enables determination of whether to disable charging of the device from the battery of the device accessory based on the second device battery charging threshold.

4. The apparatus of claim 2, wherein:
the device battery charging threshold corresponds to a first voltage, and
the second device battery charging threshold corresponds to a second voltage.

5. The apparatus of claim 2, wherein:
the device battery charging threshold corresponds to a first ratio of a first available charge of a device battery of the device to a battery capacity of the device battery, and the second device battery charging threshold corresponds to a second ratio of a second available charge of the device battery to the battery capacity.

6. The apparatus of claim 1, wherein the application is executable by the device to prompt a user via a graphical user interface (GUI) to adjust the device battery charging threshold.

7. A method comprising:
in a case that is mechanically connected to a wireless device, the case including a battery and a data storage device, performing:
using a communication technique, receiving a first indication from the wireless device of a charge level of the wireless device;
receiving a second indication of a charging threshold from the wireless device wherein the charge level is independent of the charging threshold; and
in response to the charge level being less than the charging threshold, providing a voltage to the wireless device using the battery.

8. The method of claim 7, further comprising receiving one or more of a request for write access to the data storage device or a request for read access to the data storage device.

9. The method of claim 7, wherein the case at least partially encloses the wireless device and is external to the wireless device.

10. The method of claim 7, further comprising waking a controller of the case to enable the controller to receive the first indication using a wired interface of the case, wherein the controller is woken in response to receiving a wakeup message from the wireless device using a wireless interface of the case or in response to detecting that a value of a timer satisfies a timer threshold.

11. The method of claim 7, further comprising:
receiving a third indication of a second charge level of the wireless device after charging the wireless device; and
disconnecting the voltage from the wireless device in response to determining that the second charge level of the wireless device exceeds a second charging threshold.

12. The method of claim 11, further comprising receiving information from the wireless device, the information indicating the second charging threshold.

13. The method of claim 7, wherein the charging threshold is adjustable via a user interface of the wireless device.

14. The method of claim 12, further comprising storing the information at the data storage device.

15. An apparatus comprising:
means for storing data in a non-volatile manner; and
means for receiving information of an application of a device and for storing the information in the means for storing data to be accessible to a controller of a device accessory, the information indicating a device battery charging threshold,
wherein accessibility of the information to the controller of the device accessory enables the controller to determine whether to initiate charging of the device from a battery of the device accessory based on a charge level associated with the device and further based on the device battery charging threshold while the application is not executing at the device, the charge level independent of the device battery charging threshold.

16. The apparatus of claim 15, further comprising means for presenting a graphical user interface (GUI) to enable user adjustment of the device battery charging threshold, wherein the means for receiving is configured to receive the information via the GUI.

* * * * *